(No Model.)
L. G. WOOLLEY.
SCALE BEAM.
No. 491,458. Patented Feb. 7, 1893.
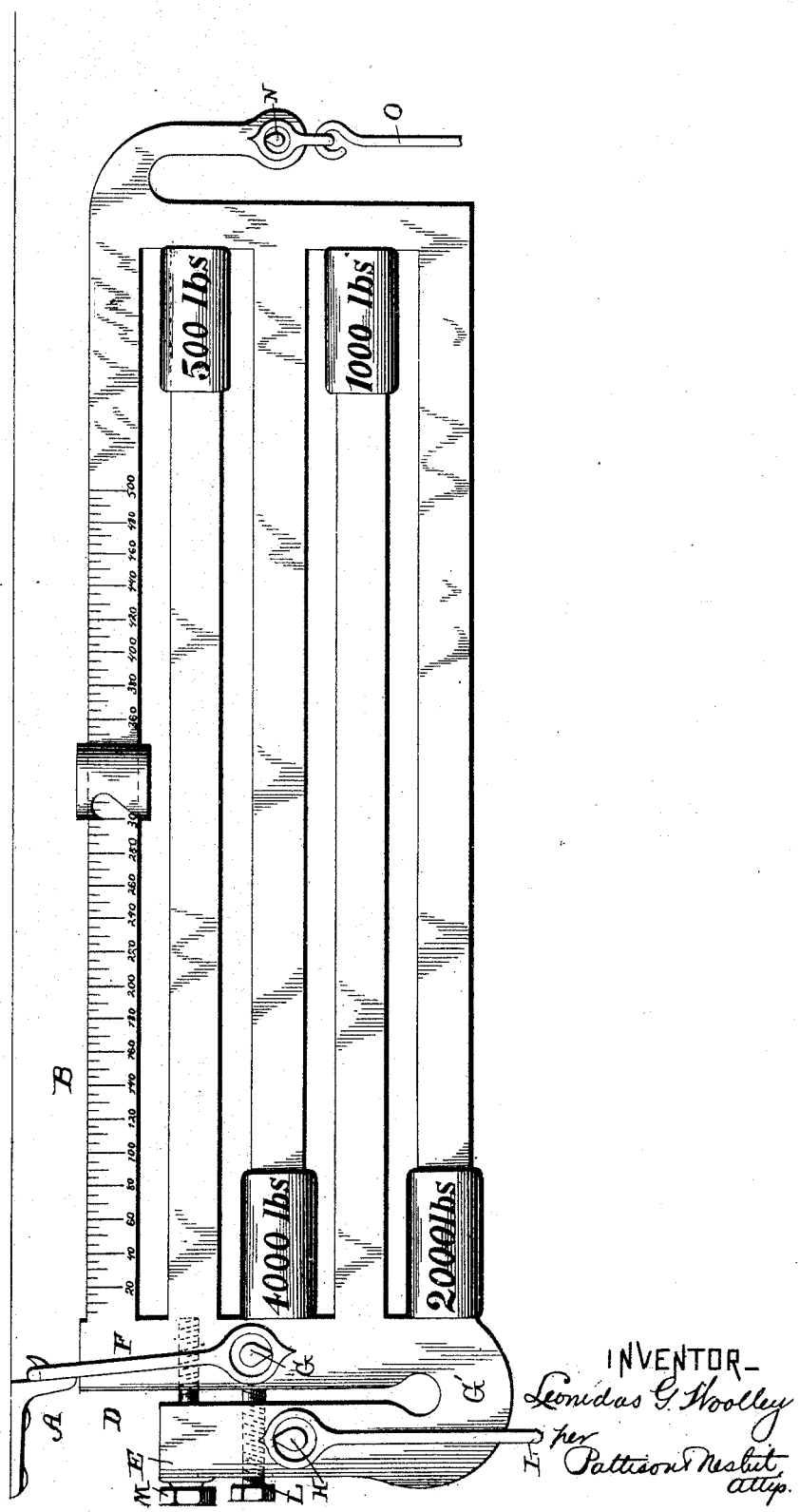
WITNESSES
Geo. E. Frick.
R. G. Fitzgerald.
INVENTOR
Leonidas G. Woolley
per Pattison & Nesbit,
attys.

United States Patent Office.

LEONIDAS G. WOOLLEY, OF GRAND RAPIDS, MICHIGAN.

SCALE-BEAM.

SPECIFICATION forming part of Letters Patent No. 491,458, dated February 7, 1893.

Application filed June 2, 1892. Serial No. 435,289. (No model.)

*To all whom it may concern:*

Be it known that I, LEONIDAS G. WOOLLEY, of Grand Rapids, in the county of Kent and State of Michigan, have invented certain new and useful Improvements in Weighing-Scales; and I do hereby declare the following to be a full, clear, and exact description of the invention, such as will enable others skilled in the art to which it pertains to make and use it, reference being had to the accompanying drawing, which forms part of this specification.

My invention relates to improvements in weighing scales; and it consists in the construction thereof, as will be fully described hereinafter and particularly pointed out in the claims.

The primary object of my invention is to provide a weighing scale with a beam so constructed that its knife edge bearings can be quickly and readily adjusted in relation to each other, and thus not only avoid the long and tedious method usually employed for this purpose, but also insure a permanent accuracy of adjustment not heretofore attained.

Scales are ordinarily adjusted by removing the knife edge bearings after they have been placed in position, and then dressing one edge thereof so as to bring the bearing edges of the two bearings nearer together, or to separate them as may be required, and it is necessary in this case to remove the beam from the jack into which it is placed, and remove the weights placed thereon for testing it, which requires a great deal of time, for it is likely that this will have to be several times done before the scale is properly and accurately adjusted. Again in dressing the edges of the bearings, it is frequently the case that the bearings at opposite sides of the beam are not finished to bring them in line with each other, or not at right angles to the beam as they should be to make the scale accurate. In this event, after the scales have been used awhile and the bearings become worn, the leverage or fulcrum of the beam is changed, thus effecting the accuracy thereof very considerable, for an almost imperceptible change between the distances of these bearings will make the scale inaccurate to the amount of fifty or more pounds.

In the accompanying drawing,—the figure is a side view of my invention complete.

A indicates a hook which is suspended from the upper portion of the beam box, and over this hook a yoke F is placed, that has its lower ends provided with circular openings into which the knife edge bearing G extends and thereby supports the inner or rear end of the scale beam B in the ordinary manner. This scale beam B, is here shown of the quadruple form, and the usual sliding weights therefor, but as this forms no part of my invention, a description thereof need not be given.

The inner vertical end D of the scale beam B, has its lower edge doubled upon itself as shown at G' thus forming the parallel vertical portion E, which together provide the beam with substantially a U-shaped inner end as will be seen. This portion E of the U-shaped inner end of the beam is provided with the other knife edge H, over which the upper ends of the stirrup I rest. The rod extending to the platform hooks into this stirrup in the usual manner. Passing through this portion E loosely at a suitable point, is a screw M which has its inner end screw threaded and passing into the vertical portion D of the beam. Also passing through the portion E but screw threaded therein and having its inner end abutting against the outer edge of the portion D, is a second screw L. By means of these screws the portion E carrying one of the knife edge bearings at the inner end of the beam is adjusted in relation to the portion D which carries the other bearing, and thus the relative distance of one bearing from the other is quickly, readily and accurately adjusted. Owing to this construction, the bearings G and H are permanently placed in the inner end of the beam, after they have been nicely and accurately finished to a knife edge as usual. These bearings are placed approximately at the right distance apart, but which seldom if ever is absolutely correct. Now the beam being placed in a jack and the testing weights placed thereon, it will be at once seen that in order to adjust the two bearings to make the proper and accurate leverage, it is only necessary to manipulate the screws M and L, to draw the bearings together, or force them apart by springing the lower portion of the inner U-shaped end of the beam, thus adjusting the beam in a few minutes, whereas heretofore it has required hours.

While I prefer to form the portion E as an integral part of the beam by casting it therewith, yet it will be understood that it can be secured thereto afterward, or it can even be hinged at its lower end to the lower end of the vertical portion D of the beam, and the same result as to the adjustment be accomplished, without departing from the spirit of my invention. The other end of the beam B is provided with the usual bearing N from which is suspended the usual weight supporting rod O.

Having thus described my invention what I claim and desire to secure by Letters Patent is,—

1. A scale beam having its inner end formed into integral substantially parallel portions, one parallel portion capable of movement in relation to the other, a bearing in each portion, and a means for moving and holding said movable portion, substantially as described.

2. A scale beam having its inner end substantially U-shaped, a bearing in each portion of the U-shape inner end, and a means for adjusting one parallel portion of the inner U-shaped end in relation to the other.

3. A scale beam having its inner end substantially U-shaped, a bearing in each portion of the U-shape, a screw passing through one portion of the U-shape and screwed into the other, and a screw passing through one portion and resting against the other portion thereof, whereby one portion is adjustable in relation to the other, substantially as set forth.

In testimony whereof I affix my signature in presence of two witnesses.

LEONIDAS G. WOOLLEY.

Witnesses:
   OCTAVIUS KNIGHT,
   E. ARTHUR.